United States Patent [19]

Spector

[11] Patent Number: 5,182,021

[45] Date of Patent: Jan. 26, 1993

[54] BIOLOGICAL PROCESS FOR ENHANCED REMOVAL OF AMMONIA, NITRITE, NITRATE, AND PHOSPHATE FROM WASTEWATER

[75] Inventor: Marshall L. Spector, Emmaus, Pa.

[73] Assignee: Lehigh University, Bethlehem, Pa.

[21] Appl. No.: 808,091

[22] Filed: Dec. 16, 1991

[51] Int. Cl.$^5$ ............................................. C02F 3/30
[52] U.S. Cl. .................................. 210/605; 210/625; 210/630; 210/903; 210/906
[58] Field of Search ............... 210/605, 625, 626, 630, 210/903, 906

[56] References Cited

U.S. PATENT DOCUMENTS

| | | | |
|---|---|---|---|
| 3,681,235 | 8/1972 | Dopol | 210/625 |
| 4,173,531 | 11/1979 | Matsch et al. | 210/903 |
| 4,271,026 | 6/1981 | Chen et al. | 210/903 |
| 4,315,821 | 2/1982 | Climenhage | 210/903 |
| 4,460,470 | 7/1984 | Reimann | 210/625 |
| 4,488,967 | 12/1984 | Block et al. | 210/906 |
| 4,488,968 | 12/1984 | Hong et al. | 210/625 |
| 4,874,519 | 10/1989 | Williamson | 210/603 |
| 4,999,111 | 3/1991 | Williamson | 210/903 |

FOREIGN PATENT DOCUMENTS 56-65693 6/1981 Japan .
57-187097 11/1982 Japan .

Primary Examiner—Wilbur Bascomb, Jr.
Assistant Examiner—Christopher Upton
Attorney, Agent, or Firm—Rhodes, Coats & Bennett

[57] ABSTRACT

A method is disclosed for attaining concurrent biological nitrification and dentrification in an aerobic zone of an activated sludge treatment plant. The method comprises aerating a mixed liquor in an aerobic stage of a secondary treatment zone to attain nitrification of ammonia values to $NO_x$, transferring the mixed liquor to a settling zone where activated sludge is allowed to settle from the mixed liquor, transferring at least a portion of the sludge to an anaerobic sludge holding zone where it is held for a prolonged period, and returning the aged sludge from the sludge holding zone to the secondary treatment zone for mixing with influent wastewater. By holding the sludge in the sludge holding zone for a prolonged period, a culture of organisms is developed which exhibits an oxygen respiration block in the presence of $NO_x$. When returned to the aerobic zone where nitrification is achieved, these organisms utilize the $NO_x$ being formed as an electron acceptor to metabolize sorbed BOD and to discharge the respiratory block. The result is concurrent biological nitrification and denitrification in the aerobic zone.

17 Claims, 2 Drawing Sheets

BIOLOGICAL PROCESS FOR ENHANCED REMOVAL OF AMMONIA, NITRITE, NITRATE, AND PHOSPHATE FROM WASTEWATER

FIELD OF THE INVENTION

The present invention relates generally to activated sludge systems for the treatment of waste water and more particularly to biological nutrient removal processes for removing nitrogen and phosphate from wastewater.

BACKGROUND OF THE INVENTION

The eutrophication of lakes, rivers and other water resources is receiving worldwide attention. The presence in the environment of nutrients, such as phosphate and nitrogen is one of the primary causes of eutrophication. These nutrients promote unwanted growth of algae and other aquatic plants.

The eutrophication of our lakes and rivers has led to increased demands for nutrient control in wastewater treatment plants. Governmental agencies have enacted increasingly stringent regulations controlling the amount of nutrients which can be discharged into receiving waters. Since conventional treatment processes remove only small amounts of nitrogen and phosphate, wastewater treatment plants will be required to change or modify their processes to meet these increasingly stringent regulations. Unfortunately, the technology to achieve the required removal efficiencies is lagging behind regulatory requirements.

One approach for accomplishing nutrient removal is biological treatment in a modified activated sludge system without chemical addition. Numerous biological nutrient removal processes have been developed. These biological nutrient removal processes typically use a single sludge configuration in which the organic matter of the influent is used as the carbon and energy source for nitrogen and phosphate removal. This allows for lower operating cost in comparison to multiple sludge systems and other physical-chemical systems.

In such biological systems, removal of nitrogen from wastewater is conventionally done by first nitrifying (converting ammonia to nitrite and nitrate, $NO_x$) and then denitrifying (reducing $NO_x$ to $N_2$) the wastewater. The process of nitrification is carried out in an aerobic environment by autotrophic organisms which derive energy for growth by oxidizing ammonia nitrogen values to $NO_x$. The energy produced is then utilized to produce protein material from inorganic components in the wastewater, such as $H_2O$, $CO_2$ and $NH_3$. Denitrification is typically carried out in an oxygen-less environment by heterotrophic organisms which utilize $NO_x$ in the absence of oxygen as an electron acceptor for oxidation of sorbed organic compounds.

One biological nutrient removal process which is commonly used is known as the Bardenpho Process. The Bardenpho Process consists of an initial anaerobic contact zone followed by four alternating stages of anoxic and aerobic conditions. In the anaerobic zone, all of the raw wastewater is mixed with the return sludge. The anaerobic conditions in the initial contact zone is necessary to effect phosphate removal. The first anoxic zone follows the anaerobic zone. Nitrates and nitrites ($NO_x$) are supplied to the anoxic zone by recycling nitrified mixed liquor from the following aerobic zone. The organic material in the raw wastewater is used as a carbon source by the denitrifying bacteria in the first anoxic zone to reduce $NO_x$ to elemental nitrogen or nitrous oxide. The first aerobic (oxic) zone is followed by a second anoxic zone where any remaining $NO_x$ in the mixed liquor is reduced by the endogenous respiration of the activated sludge. The final stage is aerobic where the mixed liquor is reaerated before reaching the final clarifier. The dissolved oxygen of the wastewater effluent is increased to prevent further denitrification in the clarifier and to prevent the release of phosphates to the liquid in the clarifier.

The Bardenpho Process is capable of achieving a high percentage of nitrogen compound removal as well as phosphate removal. However, the Bardenpho Process requires substantially larger tank volumes than conventional activated sludge systems which means higher capital outlays. Additionally, the Bardenpho System relies on endogenous respiration in the second anoxic reactor which is a relatively slow process. Thus, its use is limited to small plants.

Another biological nutrient removal process which is frequently used is known in the industry as the $A^2O$ Process. The $A^2O$ process consists of three treatment zones—anaerobic, anoxic and aerobic. The wastewater and return sludge are mixed in the first treatment zone which is maintained under anaerobic conditions to promote phosphate removal. The anaerobic zone is followed by an anoxic zone. The third treatment zone is an aerobic zone where nitrification of the mixed liquor is achieved. The nitrified mixed liquor is recycled back to the anoxic zone where the nitrate and nitrite is reduced to elemental nitrogen and/or nitrous oxide by denitrifying organisms. The $A^2O$ system has a high rate of nitrogen removal and requires total tank volume comparable to that of conventional activated sludge systems. Thus, the $A^2O$ system is a cost effective system for nutrient removal. However, the $A^2O$ system requires a relatively high mixed liquor recycle rate in order to achieve high nitrogen removal efficiency.

Accordingly, there is a need for a biological nutrient removal process which accomplishes high nitrogen removal efficiencies, which is cost effective, and which minimizes capital outlays required to retrofit conventional activated sludge systems.

SUMMARY AND OBJECTS OF THE INVENTION

The present invention provides an improved activated sludge system for obtaining a higher nitrogen removal efficiency at lower costs than prior art systems. The process of the present invention achieves this goal by oxidizing ammonia nitrogen values in the wastewater to $NO_x$ in an aerobic zone while concurrently reducing $NO_x$ to elemental nitrogen and/or nitrous oxides. Concurrent biological nitrification and denitrification (CBND) in a single reactor greatly reduces the tank volume required for removal of nitrogen from wastewater thereby reducing capital outlays. Further, the process of the present invention requires no chemicals so operating costs are extremely low.

In order to induce the CBND in a single reactor, the improved process ages the return sludge in a holding tank under non-aerated conditions for a prolonged period of time to condition the return sludge prior to its being mixed with the influent. The length of the holding period is substantially longer than necessary to achieve complete denitrification of the return sludge. Experiments suggest that a holding period of approximately 4 to 20 hours after complete denitrification of the return sludge is necessary. The anaerobically conditioned sludge is then mixed with influent wastewater in an initial contact zone which is maintained under anaerobic conditions. The mixed liquor thus formed is oxidized in an aerobic zone having a D.O. concentration of preferably 1 to 3 ppm. During this aerobic period, ammonia values in the mixed liquor are oxidized to $NO_x$ and the $NO_x$ so produced is concurrently reduced to $N_2$ and/or $N_2O$ by "aerobic denitrifiers." While it is preferred that anaerobic and aerobic treatment may be carried out in separate reactors in a continuous process, the present invention may also be carried out in a sequencing batch reactor (SBR).

The mechanism by which CBND is achieved is not known. It is speculated that the prolonged anaerobic holding period of the return sludge promotes the selection of organisms which exhibit an oxygen respiration block in the presence of $NO_x$. These organisms appear to have developed a survival mechanism that enables them to utilize $NO_x$ as an electron acceptor, even in the presence of high levels of D.O. When these organisms, following prolonged anaerobosis, are returned to the aerobic zone where nitrification is being attained, they reduce $NO_x$ to elemental nitrogen and/or nitrous oxide.

The process of the present invention effects not only nitrogen removal, but also phosphate removal and sludge bulking control. Because the return sludge is mixed with influent wastewater in an anaerobic zone phosphate storing organisms have preferential access to BOD in the influent. As a result, the process tends to favor selection of these organisms to the disadvantage of other species of organisms. These organisms have been found to effect both phosphate removal and the production of a non-bulking sludge.

Based on the forgoing, it is an object of the present invention to provide an activated sludge system for biologically removing phosphate and nitrogen from wastewater.

Another object of the present invention to provide an activated sludge system in which concurrent biological nitrification and denitrification is effected in a single reactor.

Another object of the present invention is to provide an activated sludge system which can attain fixed nitrogen removal in excess of 85% of the total nitrogen in the influent without the use of biological denitrification filters, or recycle of nitrified mixed liquor to an upstream anoxic zone, or suspended growth denitrification.

Yet another object of the present invention is to provide an activated sludge system which can attain phosphate removal in excess of 90% of the total phosphate in the influent without the use of chemicals.

Still another object of the present invention is to provide an activated sludge system which requires less tank volume than conventional activated sludge systems.

Another object of the present invention is to provide an activated sludge system which requires less capital investment and has lower operating costs than conventional activated sludge systems.

Still another object of the present invention is to provide an activated sludge system which produces a relatively dense, non-filamentous sludge which settles rapidly in the final clarifier.

Other objects and advantages of the present invention will become apparent and obvious from a study of the following description and the accompanying drawings which are merely illustrative of such invention.

DETAILED DESCRIPTION OF THE INVENTION

Figure 1:
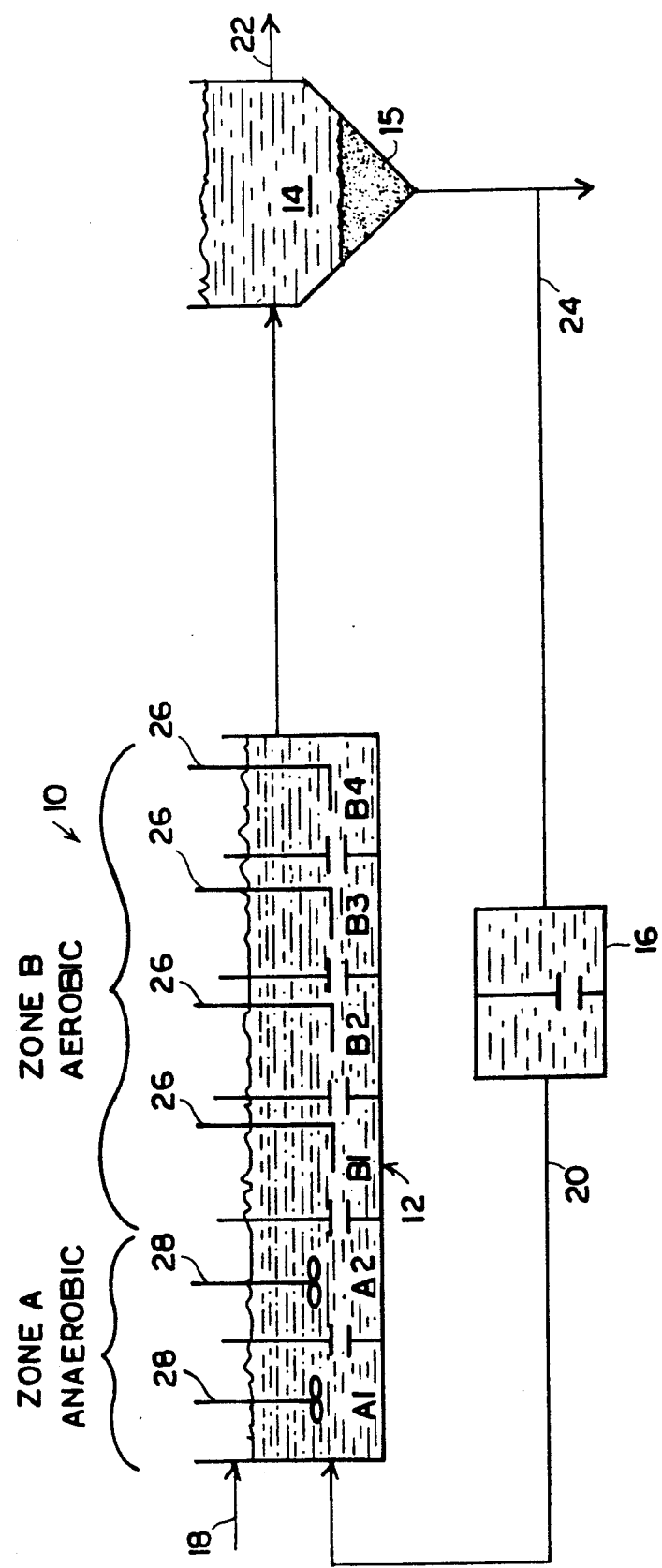
FIG. 1 is a schematic diagram illustrating one embodiment of the present invention.

Referring now to the drawings, and particularly to FIG. 1, a modified activated sludge wastewater treatment system is shown therein and indicated generally by the numeral 10. The wastewater treatment system includes a secondary treatment zone indicated generally at 12, a final clarifier 14, and a sludge holding tank 16. The secondary treatment zone 12 comprises an anaerobic first stage A followed by an aerobic stage B. The anaerobic stage A and aerobic stage B are preferably partitioned into two or more cells in order to approximate plug flow of liquid. It has been found that by provision of physically partitioned sections or the hydraulic equivalent thereof, there is better assurance of achieving freedom from filamentous growth and selection of a biomass in zone A capable of effecting CBND and better assurance of removal of $NO_x$ and phosphates in zone B. In the embodiment shown, the anaerobic stage is divided into two distinct cells A1 and A2. The aerobic stage is divided into four distinct cells B1-B4.

Wastewater to be treated enters anaerobic stage A through line 18 where it is mixed with return activated sludge from the sludge holding tank 16 which enters through line 20. Typically, wastewater is settled sewage from a primary sedimentation tank or clarifier (not shown), but primary sedimentation is not necessary. The influent wastewater initially enters cell A1 where it is stirred and admixed with recycled sludge to form a mixed liquor.

After anaerobic treatment, the mixed liquor is transferred to the aerobic zone B where the mixed liquor is aerated. Oxygen-containing gas such as air is admitted into each cell B1-B4 in a manner well-known to those skilled in the art. For example, compressed air may be admitted into each cell (B1-B4) by spargers 26. Alternatively, the secondary treatment area 12 may be provided with mechanical aerators instead of, or in addition to spargers.

In the aerobic zone B, the mixed liquor is aerated under conditions sufficient to oxidize BOD and to convert ammonia ($NH_3$) present in the wastewater to $NO_x$. The $NO_x$ so produced is concurrently reduced by "aerobic denitrifiers" as will be hereinafter described.

To achieve almost complete nitrification, the sludge age within the system should be about 1.5 days at 30° C. and 10 days at 10° C. Sludge age is defined as the weight of MLSS in zone B divided by the weight of MLSS wasted per day. Further, the dissolved oxygen concentration should be maintained between about 1 to 3 ppm, although nitrification may be attained at D.O. levels as low as 0.5 ppm. Lower dissolved oxygen concentrations retard or inhibit ammonia oxidation, while higher D.O. concentrations retard the extent of concurrent biological nitrification and denitrification (CBND) in the secondary treatment area.

After aeration, the mixed liquor passes from the aerobic zone B to a clarifier 14. The sludge in the mixed liquor settles to the bottom of the clarifier 14 thereby forming a clear supernatant in the top of the clarifier 14 and a dense sludge layer 15 in the bottom. The supernatant is discharged either to further treatment or directly to receiving waters through line 22. Activated sludge concentrated in sludge layer 15 on the bottom of the clarifier 14 is transferred to a sludge holding tank 16 through line 24 where the sludge is held in the substantial absence of added oxygen for a prolonged period, i.e. from approximately 4 hours to 20 hours after complete denitrification of the sludge 15. If the sludge is held fewer than 4 hours, the extent of CBND is reduced. If held more than 20 hours, excessive expense is incurred for unnecessary storage capacity. The minimum of 4 hours in the holding tank may be diminished by the nominal sludge residence time in the clarifier, provided that the sludge in the clarifier is free of $NO_x$ and is not re-exposed to oxygen in transit from the clarifier 14 to the holding tank 16.

In order to prevent sludge from "bypassing" the sludge holding zone, it is preferred that the sludge holding zone be divided by partitions into two or more sections approximately plug flow conditions. This arrangement will prevent sludge from bypassing and will assure that the sludge is sufficiently conditioned prior to its return to the mainstream.

By holding the sludge for a prolonged period under anaerobic conditions, a biomass is developed which exhibits an oxygen respiration block in the presence of $NO_x$. These organisms appear to have developed a survival mechanism that enables them to utilize $NO_x$ as an electron acceptor, even in the presence of high levels of dissolved oxygen. A possible explanation is that nitrite reduction enzymes in these organisms are activated by the prolonged anaerobic storage period and remain active during several hours of aerobic conditions. When these organisms are returned to the aerobic zone B, where nitrification is being attained, they utilize $NO_x$ as an electron acceptor to metabolize sorbed BOD. The result is that concurrent biological nitrification and denitrification is achieved in the aerobic zone B, even under aeration saturation conditions.

The present invention also effects phosphate removal and bulking sludge control due to the anaerobic "feeding" zone in the secondary treatment zone 12. In the anaerobic zone A, BOD is sorbed by polyphosphate-storing organisms. These organisms hydrolyze stored polyphosphates to provide energy for the transport and storage of BOD within the cell wall. The uptake of BOD by these organisms is accompanied by a release of phosphate. When the mixed liquor is then subsequently aerated, the sorbed BOD is oxidized and phosphate is taken up by the organisms. The phosphate in the mixed liquor is therefore reduced to extremely low levels.

Figure 2:
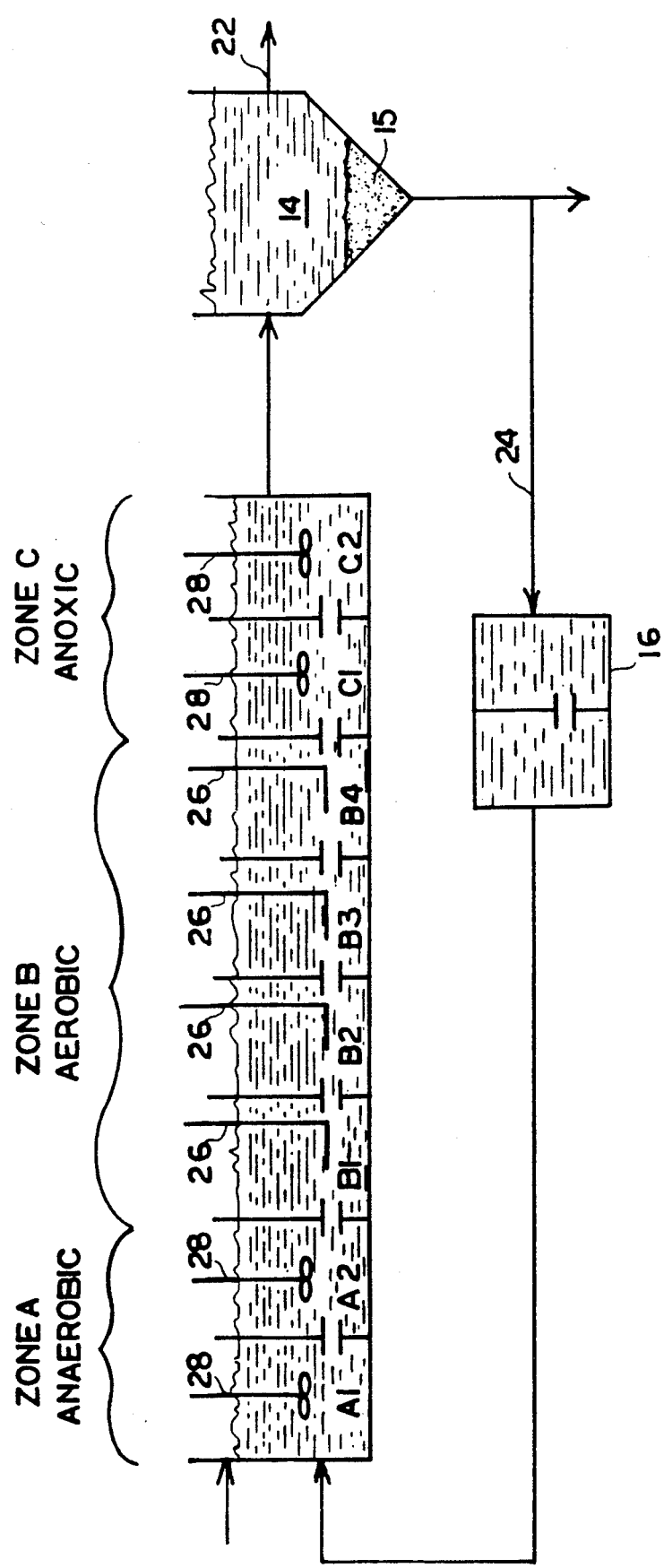
FIG. 2 is a schematic diagram illustrating an alternate embodiment of the present invention.

In FIG. 2, an embodiment of the present invention is shown which provides for enhanced removal of phosphate and $NO_x$. This is accomplished by the provision of an anoxic treatment zone C which is positioned downstream from the aerobic zone B. The anoxic treatment zone C is maintained in the substantial absence of dissolved oxygen.

The anoxic treatment zone C is equipped with stirrers 28 and is partitioned into two or more cells. The mixed liquor leaving zone B and entering zone C contains some $NO_x$ which has not been removed by CBND. After entering the anoxic zone, facultative organisms reduce $NO_x$ to elemental nitrogen and/or nitrous oxide using residual organics remaining in the biomass or wastewater as electron donors. Thus, this embodiment combines the processes of "aerobic denitrification" and "anoxic denitrification" to achieve extremely low levels of nitrogen in the effluent.

During anoxic treatment, there is also a noticeable reduction of phosphate. The uptake of phosphate which begins in the aerobic zone carries over into the anoxic zone, so long as sufficient $NO_x$ is present.

A significant advantage of this process is that it eliminates any need for recycling mixed liquor to a preceeding anoxic zone. Since the anoxic zone is placed after the aerobic zone, the volume required will be less than with conventional activated sludge processes. Total retention times for this process are much lower than for the Bardenpho process, and removal efficiencies are much higher than for conventional A/O processes.

Several examples, using the method of the present invention are set out below. These examples are illustrative of the present invention and are not meant to be limiting.

EXAMPLE 1

Two laboratory units were operated as shown in FIG. 1 over a period of two weeks. The dissolved oxygen concentration in Unit 1 was maintained at approximately 8 ppm (close to air saturation). The dissolved oxygen concentration in Unit 2 was maintained at approximately 2 ppm. The results are reported in Table 1 below.

TABLE 1

|  | Unit 1 | Unit 2 |
| --- | --- | --- |
| Influent |  |  |
| SBOD5 (mg/l) | 193 | 192 |
| TKN (mg/l) | 22 | 21 |
| $NO_x$—N (mg/l) | 0 | 0 |
| NH3—N (mg/l) | 21 | 20 |
| Total P (mg/l) | 7.1 | 7.1 |
| Operating Conditions |  |  |
| Volume (liters) | 2.0 | 2.0 |
| D.O. In Aerobic Zone (mg/l) | 8.0 | 2.0 |
| Total HRT (minutes) | 1440 | 1440 |
| Anaerobic HRT (minutes) | 42 | 42 |
| Aerobic HRT (minutes) | 150 | 150 |
| Clarifier HRT (minutes) | 68 | 68 |
| Sludge Holding Period (minutes) | 1176 | 1176 |
| Sludge Recycle (% of influent) | 43% | 43% |
| MLSS (mg/l) | 3422 | 3499 |
| Effluent |  |  |
| SBOD5 (mg/l) | <5 | <5 |
| NH3—N (mg/l) | .33 | .22 |
| $NO_x$—N (mg/l) | 4.5 | 1.1 |
| Total P (mg/l) | 3.7 | 1.3 |
| Protein Nitrogen (mg/l) | 1.9 | 3.1 |
| Missing Nitrogen (mg/l) | 15.3 | 16.7 |

It will be see from Table 1 that Unit 1 removed approximately 17.2 ppm of nitrogen from the influent. The missing nitrogen in Unit 1, which is believed to be removed by CBND, was 15.3 ppm. Missing nitrogen is the nitrogen removed that cannot be accounted for by protein nitrogen, effluent nitrogen or $NO_x$ reduced during setting in the clarifier. Unit 2 removed approximately 19.7 ppm of nitrogen, of which 16.7 ppm are considered missing nitrogen removed by CBND. The total phosphate removed was 48% for Unit 1, and 81.6% for Unit 2.

EXAMPLE 2

A laboratory unit was run in accordance with the conditions of this invention as outlined in FIG. 1, except the anaerobic sludge holding was omitted. Average values for two weeks of operation are reported in Table 2.

TABLE 2

| Influent | |
| --- | --- |
| SBOD5 (mg/l) | 96 |
| TKN (mg/l) | 14.0 |
| NO$_x$—N (mg/l) | 0 |
| NH3—N (mg/l) | 12.9 |
| Total P (mg/l) | 7.1 |
| Operating Conditions | |
| Volume (liters) | 2.0 |
| D.O. In Aerobic Zone (mg/l) | 8.0 |
| Total HRT (minutes) | 240 |
| Anaerobic HRT (minutes) | 42 |
| Aerobic HRT (minutes) | 110 |
| Clarifier HRT (minutes) | 68 |
| Sludge Recycle (% of influent) | 43% |
| MLSS (mg/l) | 2819 |
| Effluent | |
| SBOD5 (mg/l) | <5 |
| NH$_3$—N (mg/l) | .39 |
| NO$_x$—N (mg/l) | 6.0 |
| Total P (mg/l) | .7 |
| Protein Nitrogen (mg/l) | 4.5 |
| Missing Nitrogen (mg/l) | 3.1 |

In this test, the unit without a prolonged sludge holding zone removed approximately 9.4 ppm of nitrogen. In Units 1 and 2 of Example 1, total nitrogen removed was 17.2 ppm and 19.7 ppm respectively. The missing nitrogen (which is removed by CBND) was only 3.0 ppm, compared to 15.3 ppm and 16.7 pp in Units 1 and 2 of Example 1. This illustrates the effectiveness of prolonged sludge holding in promoting CBND.

EXAMPLE 3

Example 3 illustrates the process shown in FIG. 2 wherein an anoxic trim zone follows the aerobic zone. As discussed herein before the anoxic zone tends to trim both the nitrogen and phosphate and effectively reduces these nutrients to a relatively low level.

Two laboratory units were operated as described in Example 1, except that the duration of the sludge holding was reduced from 1167 to 1047 minutes and the mixed liquor was held and gently stirred in the anoxic zone for a period of 120 minutes. The mixed liquor of the anoxic zone was sampled at various time periods indicated in Table 3. Results of the filtrate analysis from the anoxic zone are shown in Table 3.

TABLE 3

| | nitrite ppm | | nitrate pm | | NO$_X$ ppm | | ammonia ppm | | phosphate, ppm | |
| --- | --- | --- | --- | --- | --- | --- | --- | --- | --- | --- |
| | Unit 1 | Unit 2 | Unit 1 | Unit 2 | Unit 1 | Unit 2 | Unit 1 | Unit 2 | Unit 1 | Unit 2 |
| end of aeration | .65 | 2.17 | 1.4 | .88 | 2.05 | 3.05 | .6 | .5 | 1.4 | 3.1 |
| 15 min. | — | 1.19 | — | 1.00 | — | 2.19 | — | .4 | — | 1.9 |
| 30 | — | .85 | — | 1.06 | — | 1.91 | — | .2 | — | 1.1 |
| 60 | — | .51 | — | 1.13 | — | 1.64 | — | .3 | — | 0 |
| 120 | .19 | .24 | .67 | 1.22 | .87 | 1.46 | .28 | .2 | 0 | 0 |

The above data indicates that the total nitrogen is trimmed significantly and the phosphate in the filtrate is reduced to less than the limit of detection. The data suggests that an anoxic retention time of 60 min. will be sufficient to remove virtually all soluble phosphate and to reduce total nitrogen to less than 2.0 ppm.

The process of the present invention has several significant advantages over prior art activated sludge treatment systems. First, because nitrification and denitrification is carried out in a single reactor, the present invention reduces the total tank volume required for removing nitrogen from the wastewater. The lower tank volume results in a tremendous savings in terms of capital outlays needed to construct or modify a treatment plant to practice the present invention. Further, the present invention has extremely low operating costs since neither chemicals nor denitrification filters are needed to attain extremely low levels of phosphate and nitrogen in the effluent. Further, the process of the present invention produces a compact, dense sludge which settles rapidly in the final clarifier. As a result, fewer operational difficulties, such as sludge loss over the weir, are encountered, and greater operational stability is realized.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. An activated sludge treatment process for removing nitrogen and phosphate from wastewater, comprising:
    (a) mixing wastewater influent containing BOD, ammonia and phosphate with activated sludge in an initial contact zone to provide a mixed liquor, said initial contact zone being maintained under anaerobic conditions;
    (b) transferring the mixed liquor to an aerobic zone where the mixed liquor is aerated to oxidize BOD in the mixed liquor, and to convert ammonia present in the mixed liquor to NO$_x$, wherein the NO$_x$ so produced is concurrently reduced to N$_2$ and/or N$_2$O;
    (c) transferring the mixed liquor to a separation zone where the activated sludge is separated from the mixed liquor;
    (d) passing at least a part of the activated sludge to a sludge holding zone maintained under anaerobic conditions and holding the activated sludge in the sludge holding zone for approximately 4 to 20 hours after complete denitrification of the sludge is achieved to effect the subsequent reduction of NO$_x$ in the aerobic zone; and
    (e) returning a portion of the activated sludge from the sludge holding tank to the initial contact zone for mixing with the influent wastewater.

2. The method of claim 1 wherein the step of aerating the mixed liquor includes maintaining the dissolved oxygen concentration with the aerobic zone from approximately 1 ppm to 3 ppm.

3. The method of claim 1 including the step of mixing the sludge while the same is being held in the sludge holding zone.

4. The method of claim 1 including the step of partitioning the sludge holding zone into two or more hydraulically distinct sections.

5. The activated sludge treatment process of claim 1 wherein the anaerobic zone comprises two or more hydraulically distinct sections.

6. The activated sludge treatment process of claim 5 wherein the aerobic zone comprises two or more hydraulically distinct sections.

7. The activated sludge treatment process of claim 1 further including the step of transferring the mixed liquor from the aerobic zone to an anoxic zone to effect anoxic denitrification of the mixed liquor before the mixed liquor is transferred to the settling zone.

8. The activated sludge treatment process of claim 7 further including the step of maintaining sufficient oxidizing agents within the anoxic zone to effect uptake of phosphate within the anoxic zone and to prevent release of phosphate within the anoxic zone.

9. An activated sludge treatment process for removing nitrogen and phosphate from wastewater comprising:
(a) forming a mixed liquor by mixing wastewater influent with return activated sludge in an initial contact zone, said initial contact zone being maintained under anaerobic conditions;
(b) transferring the mixed liquor to an aerobic zone;
(c) aerating the mixed liquor in the aerobic zone to oxidize BOD in the mixed liquor, and to convert ammonia present in the mixed liquor to $NO_x$, wherein the $NO_x$ so produced is concurrently reduced to $N_2$ and/or $N_2O$;
(d) transferring the mixed liquor from the aerobic zone to a downstream anoxic zone to effect further denitrification of the mixed liquor;
(e) transferring the mixed liquor from the anoxic to a settling zone where the activated sludge is separated from the mixed liquor;
(f) transferring at least a part of the activated sludge to a sludge holding zone where it is maintained under anaerobic conditions;
(g) holding the activated sludge in the sludge holding zone for approximately 4 to 20 hours after denitrification of the sludge is completed; and
(h) returning at least a portion of the activated sludge from the sludge holding zone to the initial contact zone for mixing with the influent wastewater so that upon aeration of the mixed liquor in the aerobic zone, concurrent nitrification and denitrification in the aerobic zone is obtained.

10. The method of claim 9 wherein the step of aerating the mixed liquor includes maintaining the dissolved oxygen concentration within the aerobic zone between approximately 1 to 3 ppm.

11. The method according to claim 9 further including the step of mixing the sludge while the same is being held in the sludge holding zone.

12. The method according to claim 9 further including the step of maintaining sufficient oxidizing agents within the anoxic zone to effect uptake of phosphate by microorganisms within the anoxic zone.

13. An activated sludge treatment process for biologically removing phosphorus and concurrently nitrifying and denitrifying wastewater in an aerobic zone of a treatment plant, comprising:
(a) mixing wastewater influent containing BOD, ammonia, and phosphate with activated sludge in an initial contact zone to form mixed liquor;
(b) transferring the mixed liquor to an aerobic zone and aerating the mixed liquor to oxidize BOD in the mixed liquor, and to convert ammonia present in the mixed liquor to $NO_x$, wherein the $NO_x$ so produced is concurrently reduced to $N_2$ and/or $N_2O$;
(c) transferring the mixed liquor to a separation zone where the activated sludge is separated from the mixed liquor;
(d) transferring at least a part of the activated sludge to a sludge holding zone maintained under anaerobic conditions and holding the activated sludge in the sludge holding zone for a prolonged period after complete denitrification of the sludge is achieved to effect the selection of microorganisms capable of reducing $NO_x$ and biologically removing phosphorus in the presence of oxygen; and
(e) returning a portion of the activated sludge from the sludge holding tank to the initial contact zone for mixing with the influent wastewater so that upon aeration of the mixed liquor in the aerobic zone the selected microorganisms concurrently reduce $NO_x$ being produced to elemental $N_2$ and/or $N_2O$ in the aerobic zone while phosphorus is biologically removed by the process.

14. The method of claim 13 including the step of holding the sludge for a period of 4 to 20 hours in the sludge holding zone after complete denitrification.

15. The method of claim 13 wherein the step of aerating the mixed liquor includes maintaining the dissolved oxygen concentration within the aerobic zone between approximately 1 and 3 ppm.

16. The method of claim 13 including the step of transferring the mixed liquor to an anoxic zone following aeration of the mixed liquor for further denitrification of the mixed liquor prior to clarification.

17. The method of claim 16 further including the step of maintaining sufficient oxidizing agents in the anoxic zone to effect uptake of phosphate by microorganisms in the anoxic zone.

* * * * *